(12) United States Patent
Gati (10) Patent No.: US 8,449,225 B2
(45) Date of Patent: May 28, 2013

(54) CUTTING TOOL AND CUTTING INSERT THEREFOR

(75) Inventor: Uzi Gati, Karmiel (IL)

(73) Assignee: Iscar, Ltd., Tefen (IL)

( * ) Notice: Subject to any disclaimer, the term of this patent is extended or adjusted under 35 U.S.C. 154(b) by 521 days.

(21) Appl. No.: 12/764,549

(22) Filed: Apr. 21, 2010

(65) Prior Publication Data

US 2010/0272524 A1  Oct. 28, 2010

(30) Foreign Application Priority Data

Apr. 23, 2009  (IL) .......................................... 198407

(51) Int. Cl.
*B23B 27/16*  (2006.01)
(52) U.S. Cl.
CPC ...................................... *B23B 27/16* (2013.01)
USPC ............ 407/107; 407/110; 407/113; 407/117
(58) Field of Classification Search
USPC ................. 407/107, 108, 110, 111, 112, 113, 407/117
See application file for complete search history.

(56) References Cited

U.S. PATENT DOCUMENTS

| 4,938,640 | A | * | 7/1990 | Pano et al. | 407/110 |
| 5,836,723 | A | * | 11/1998 | Von Haas et al. | 407/107 |
| D442,196 | S | | 5/2001 | Hansson et al. | |
| 6,261,032 | B1 | * | 7/2001 | Duwe et al. | 407/110 |
| 6,582,163 | B2 | * | 6/2003 | Hansson et al. | 407/110 |
| 6,974,283 | B2 | * | 12/2005 | Oettle | 407/107 |

FOREIGN PATENT DOCUMENTS

| CH | 664 102 | 2/1988 |
| EP | 1 129 805 | 9/2001 |

OTHER PUBLICATIONS

International Search Report in PCT/IL2010/000254, dated Jul. 20, 2010.

* cited by examiner

*Primary Examiner* — Daniel Howell
*Assistant Examiner* — Alan Snyder
(74) *Attorney, Agent, or Firm* — Womble Carlyle (57) ABSTRACT

A metal cutting tool having an insert holder and a cutting insert releasably secured therein. The insert holder has upper and lower blocks and upper and lower jaws, each jaw projects from the front end of each respective block. The cutting tool has a cutting portion support projecting transversely from the front end of the lower clamp at an angle α. The cutting insert has a shaft and a first cutting portion projecting transversely from the shaft at the angle α. The cutting insert has non-planar abutment surfaces formed to mate with corresponding, non-planar support surfaces located on the lower and upper jaws and on the cutting portion support.

17 Claims, 8 Drawing Sheets

CUTTING TOOL AND CUTTING INSERT THEREFOR

FIELD OF THE INVENTION

The present invention concerns a tool for metal cutting, where the tool has an insert holder as well as a cutting insert held in the insert holder, which cutting insert has at least a first cutting edge. The invention also relates separately to the cutting insert included in the tool.

BACKGROUND OF THE INVENTION

In a turning type of metal cutting operation, a replaceable cutting insert held in a slot located at an end of an insert holder is brought into contact with a rotating metal workpiece, causing metal chips to shear away from a cutting area on the workpiece. The slot comprises a lower and an upper slot surface that abut respectively a bottom and a top surface of the cutting insert. The lower slot surface supports the cutting insert and the upper slot surface is clamped down on the cutting insert to fix it in the slot. The forward end of the slot is open, so that a cutting edge and a rake surface of the cutting insert are exposed for cutting the workpiece and evacuating the chips.

It is necessary for the slot and the cutting insert to include means for accurately positioning the cutting insert at a selected location in the slot during installation, relative to the x, y, and z axes of three-dimensional space, and for minimizing its translational and rotational movement on these axes during cutting. To these ends, three types of abutment that restrain the cutting insert against five of six force vectors that can arise during cutting, the possible vector directions relative to the slot being: vertically up or down, laterally to either side, or longitudinally in or out. The first type of abutment, directed against vertical forces, is provided by the upper slot surface abutting the cutting insert top surface and by the lower slot surface abutting the cutting insert lower surface. The second type of abutment, directed against lateral forces, is provided by mating nonplanar profiles in the same abutting surfaces. The third type of abutment, directed against inward longitudinal force is a stop, such as a pin, at the back of the slot abutting a back surface of the cutting insert. However, no abutment is provided against outward longitudinal force. The only element restraining the cutting insert in the slot in the outward direction is friction between the upper and lower slot surfaces and the respective top and bottom cutting insert surfaces. Hence unwanted outward displacement of the cutting insert from the slot can occur when outwardly-directed force is exerted thereon during cutting operations.

It is known to provide an abutment against outwardly-directed force by forming the forward portions of the abutting lower slot surface and bottom cutting insert surface to have mating nonplanar profiles, similar to, but orthogonal to, those used for abutment against lateral forces. An example is disclosed by Pano and Braun in U.S. Pat. No. 4,938,640 (1990). However, the length of the transverse mating is limited to the width of the cutting insert. Also, the portion of the bottom surface of the cutting insert that is allocated for transverse mating could otherwise be used for longitudinal mating.

In addition to cutting forces, in some cutting operations there is a further constraint that access to the cutting area is restricted. An example of such an operation is an undercut, where material is cut away from the underside of the workpiece to leave an overhang. To operate within this constraint, it is known in the art to form the insert holder with one or more angles before the slot and to form the cutting insert of shorter than standard length. However, the shortened cutting insert has shorter bottom and top surfaces for clamping in the slot, hence it is less stable.

Another solution for cutting where access is restricted is provided by an angled cutting insert, comprising a shaft with a cutting portion projecting integrally from it at an angle, an example of which is disclosed by Hansson and Andersson in U.S. Pat. No. 6,582,163 (2001). The shaft, which can be of standard length, is clamped in the slot. However, the cutting portion is unsupported; therefore forces acting upon it are transferred to the shaft, increasing the torque of the shaft.

SUMMARY OF THE INVENTION

According to embodiments of the present invention there is provided a cutting tool and a cutting insert located in an insert holder of the cutting tool.

The cutting tool comprises an insert holder and a cutting insert, the insert holder comprising:

a block portion and a clamping portion for retaining the cutting insert and defining a forward to rearward direction, the block portion has upper and lower blocks which defines an upper to lower direction and a resilient slot between them, an upper block front face at a forward end of the upper block and a lower block front face at a forward end of the lower block; the clamping portion has upper and lower jaws integrally formed with the block the upper jaw projects forwardly from one side of the upper block front face and has an upper jaw surface, the lower jaw projects forwardly from the one side of the lower block front face and has a lower jaw surface which faces opposite the upper jaw surface; wherein:

the lower jaw has a cutting portion support, the cutting portion support projects transversely at an angle α from the forward end of the lower jaw, the cutting portion support has a generally upward facing cutting portion support surface;

the cutting insert has a shaft having shaft top and bottom surfaces and opposing side surfaces extending therebetween, a first cutting portion integrally formed with the shaft, the first cutting portion projects transversely to the shaft at the angle α from a first shaft end, the first cutting portion has opposing cutting portion top and bottom surfaces and opposing cutting portion side surfaces extending between the cutting portion top and bottom surfaces, the cutting portion top surface and the cutting portion side surfaces meet at an edge, at least a portion of which forms a cutting edge, wherein:

in the assembled position of the cutting tool, the upper jaw bottom surface abuts the shaft top surface, the lower jaw surface abuts the shaft bottom surface and the cutting portion support surface abuts the cutting portion bottom surface.

In accordance with some embodiments, the cutting insert is provided with a second cutting portion formed integrally with the shaft and projecting transversely to the shaft from a second shaft end at the angle α.

In accordance with some embodiments, the lower jaw surface has a profile that is either convex or concave.

In accordance with some embodiments, the lower jaw surface has a profile that is V-shaped.

In accordance with some embodiments, the upper jaw surface is offset towards the cutting portion.

In accordance with the present invention there also provided a cutting insert comprising a shaft and a first cutting portion integrally formed with the shaft, the shaft has a shaft top and bottom surfaces and opposing side surfaces extending therebetween, the first cutting portion projects transversely to the shaft from one shaft end at an angle α, the first cutting portion has a cutting portion top and bottom surfaces and opposing side surfaces extending therebetween, the cutting portion top surface and the cutting portion side surfaces meet at an edge, at least a portion of which forms a cutting edge, the cutting portion side surfaces adjacent the cutting edge form a relief surface and the cutting portion top surface adjacent the cutting edge forms a rake surface, wherein the cutting portion bottom surface is non-planar.

In accordance with some embodiments, the cutting portion bottom surface has a V-shaped profile.

In accordance with some embodiments, the cutting portion bottom surface has an asymmetrical profile.

In accordance with some embodiments, the cutting portion bottom surface has a profile that is either convex or concave.

In accordance with some embodiments, a second cutting portion is formed integrally with the shaft and projects transversely to the shaft from a second shaft end at an angle α.

BRIEF DESCRIPTION OF THE DRAWINGS

The objects and advantages of the invention will become apparent from the following detailed description of preferred embodiments thereof in connection with the accompanying drawings, in which like numerals designate like elements, and in which.

DETAILED DESCRIPTION OF THE INVENTION

In FIG. 1 to FIG. 6 a cutting tool 40 is shown, according to the present invention. The cutting tool 40 includes an insert holder 42 and a cutting insert 10. The cutting insert 10 is typically manufactured by form-pressing and sintering carbide powders. The insert holder 42 is typically manufactured from steel. The insert holder 42 has a block portion 44 and a clamping portion 46 for retaining a cutting insert 10. The clamping portion 46 has a clamping portion longitudinal axis L1 (FIG. 4) defining a forward to rearward direction.

Figure 1:
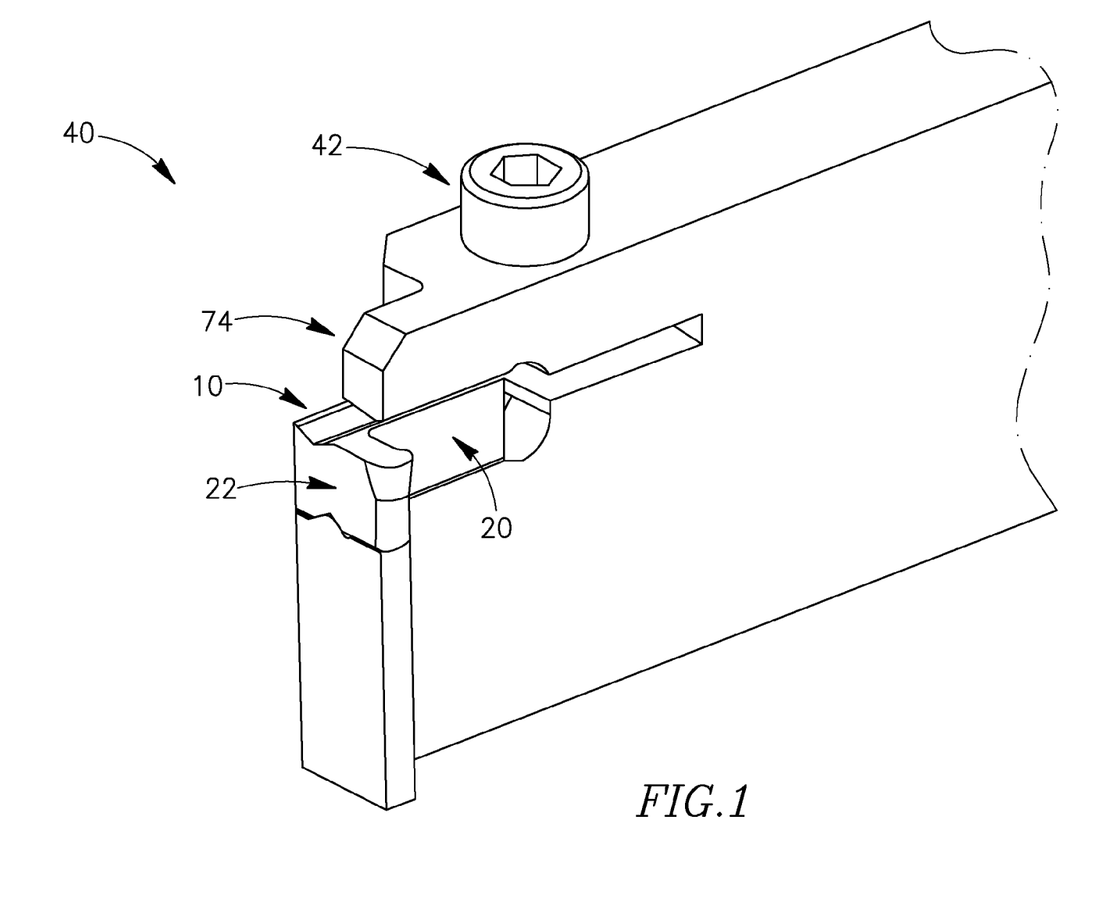
FIG. 1 is an isometric view of a cutting tool with a cutting insert secured therein, according to embodiments of the present invention.
Figure 2:
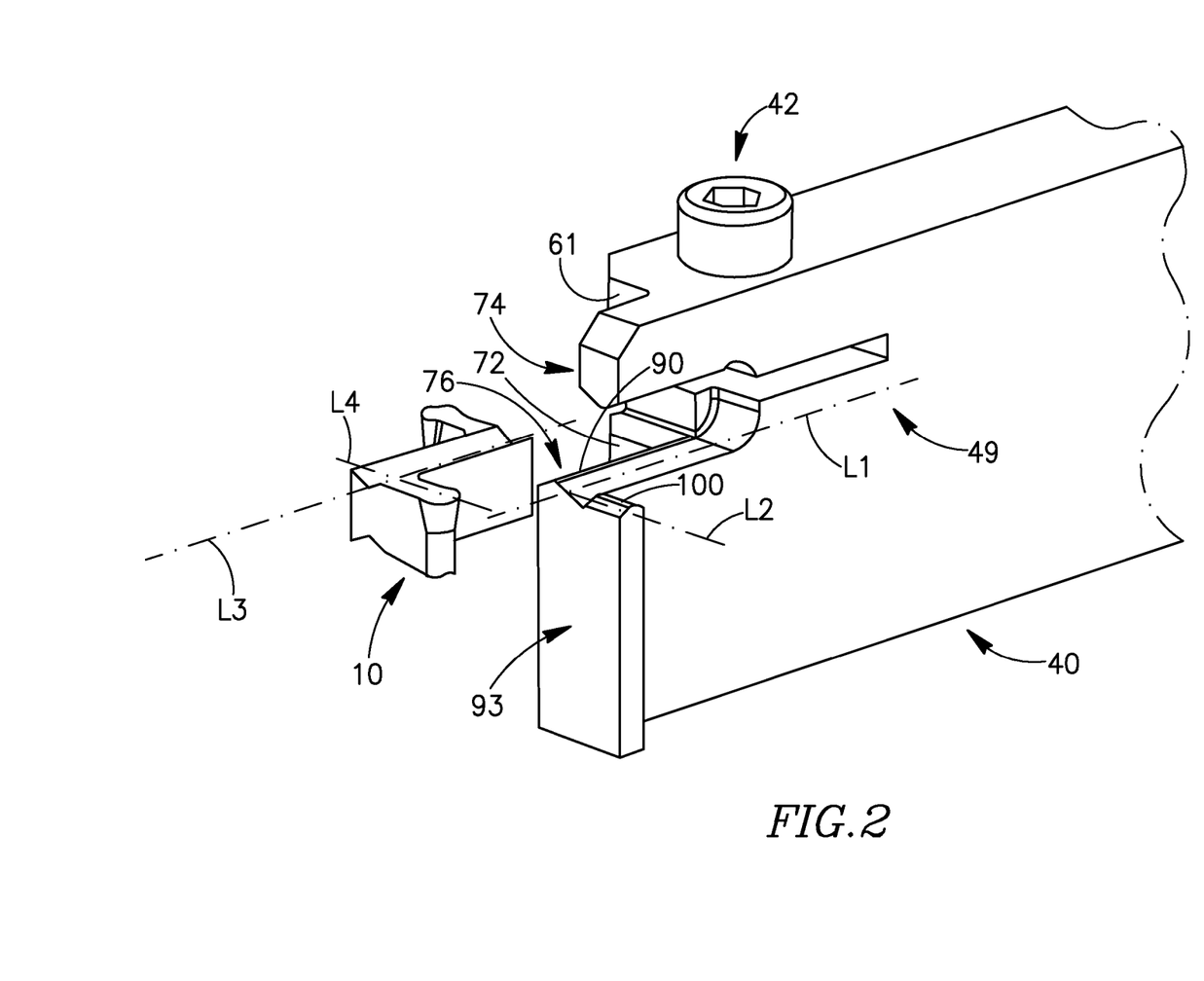
FIG. 2 is an isometric view of the cutting tool of FIG. 1, showing the cutting insert before installment in the insert holder, according to embodiments of the present invention.
Figure 3:
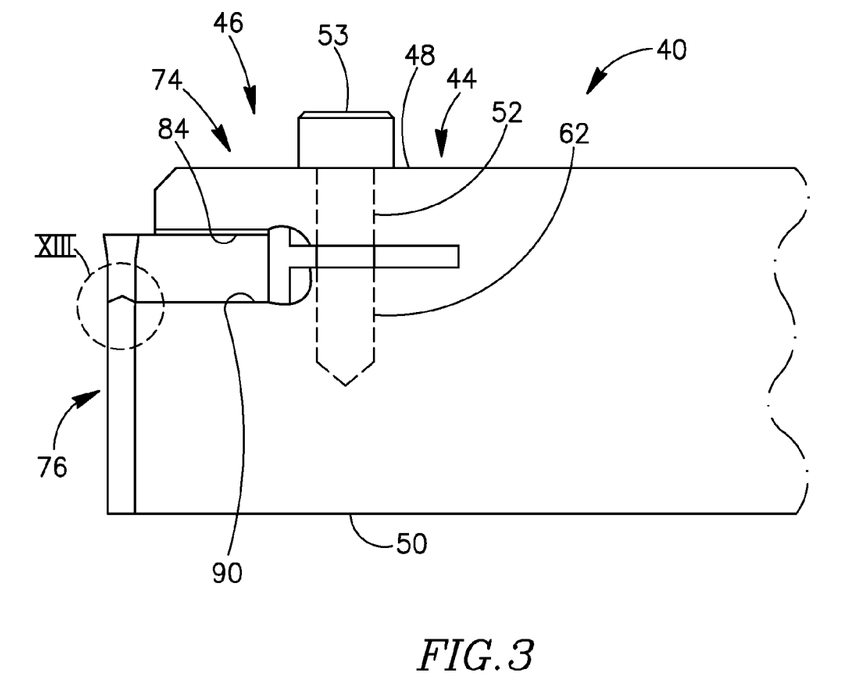
FIG. 3 is a side view of the cutting tool of FIG. 1.

The block potion 44 has upper and lower blocks 48, 50 defining an upper to lower direction and a resilient slot 49 between them. The upper block 48 has a through bore 52, through which a clamping screw 53 is inserted and an upper block front face 61 at a forward end of the upper block 48. The upper block 48 has a degree of resiliency that facilitates insertion and removal of the cutting insert 10. The lower block 50 has a threaded bore 62 into which the clamping screw 53 is threadingly engaged in order to bring the upper and lower blocks 48, 50 closer by tightening the clamping screw 53 and a lower block front face 72 at a forward end of the lower block 50. The through bore 52 and the threaded bore 62 are co-axial.

Figure 4:
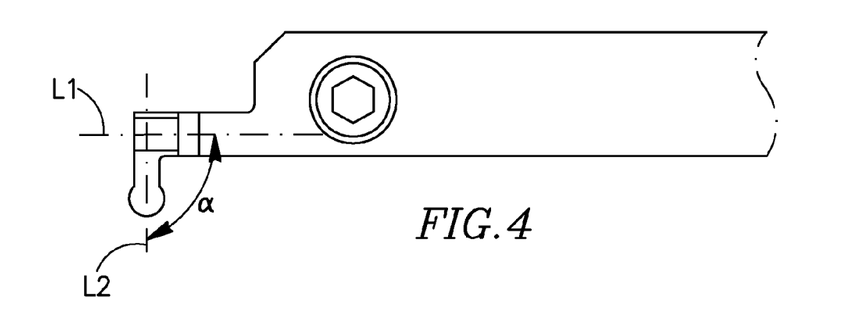
FIG. 4 is a top view of the cutting tool of FIG. 1.
Figure 5:
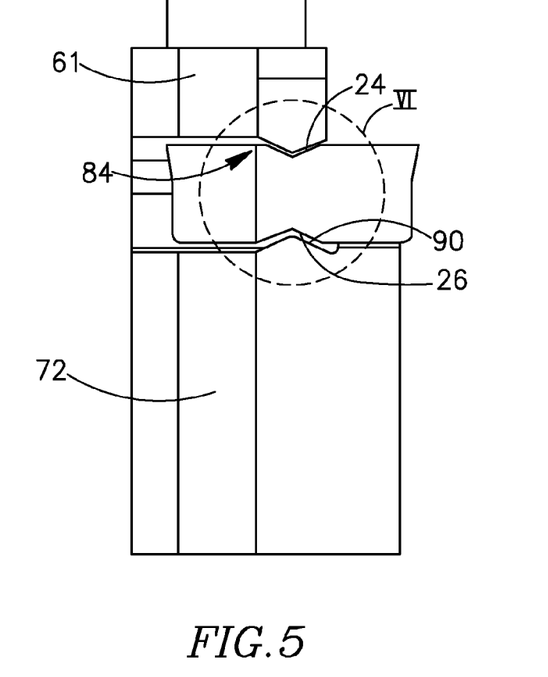
FIG. 5 is a front view of the cutting tool of FIG. 1.

The clamping portion 46 has upper and lower jaws 74, 76 integrally formed with the block portion 44 to have unitary one-piece construction therewith. The upper jaw 74 projects forwardly from one side of the upper block front face 61 and has an upper jaw surface 84. The lower jaw 76 projects forwardly from the one side of the lower block front face 72 and has a lower jaw surface 90 facing opposite the upper jaw surface 84. The lower jaw 76 has a cutting portion support 93 projecting transversely at an angle α from the forward end of the lower jaw 76. The cutting portion support 93 has a generally upward facing cutting portion support surface 100. The cutting portion support 93 defines a cutting portion support longitudinal axis L2 which together with the clamping portion longitudinal axes L1 defines a plane P1. The cutting portion support longitudinal axis L2 is oriented at the angle α to the clamping portion longitudinal axis L1, the angle α has a range of 80 to 134 degrees.

Attention is drawn to FIG. 7 to FIG. 11, showing an embodiment of the cutting insert 10 according to the present invention. The cutting insert 10 has a shaft 20 having a shaft longitudinal axis L3 and a first cutting portion 22 integrally formed with the shaft 20 to have unitary one-piece construction therewith. The first cutting portion 22 projects transversely to the shaft 20 from a first shaft end. The shaft 20 has opposing shaft top and bottom surfaces 24, 26 and opposing shaft side surfaces 23, 25 extending between the shaft top and bottom surfaces 24, 26. The first cutting portion 22 has opposing cutting portion top and bottom surfaces 27, 28 and opposing cutting portion side surfaces 29, 30 extending between the cutting portion top and bottom surfaces 27, 28. The cutting portion top surface 27 and the cutting portion side surfaces 29, 30 meet at an edge 31, at least a portion of which forms a cutting edge 32. The cutting portion side surfaces 29, 30 adjacent the cutting edge 32 form a relief surface 33 and the cutting portion top surface 27 adjacent the cutting edge 32 forms a rake surface 34. As seen in a plan view in FIG. 10, the cutting portion longitudinal axis L4 and the shaft longitudinal axis L3 form between them the angle a. With respect to the embodiment shown in FIG. 7 to FIG. 11, the cutting insert 10 is provided with a second cutting portion 36 formed integrally with the shaft 20 to have unitary one-piece construction therewith, and projecting transversely to the shaft 20 from a second shaft end. The second cutting portion 36 may be identical to the first cutting portion 22 both in structure and orientation with respect to the shaft longitudinal axis L3.

According to embodiments of the invention, the upper jaw surface 84, the lower jaw surface 90, the cutting portion support surface 100, the shaft top and bottom surfaces 24, 26 and the cutting portion bottom surface 28 may be non-planar having, for example, a V-shaped profile. In the description and claims, reference to profiles of an object refer to outlines formed on a vertical plane passing through the object at right angles to one of its principal longitudinal dimensions.

The upper jaw bottom surface 84 is formed to mate with the shaft top surface 24, the lower jaw surface 90 is formed to mate with the shaft bottom surface 26 and the cutting portion support surface 100 is formed to mate with the cutting portion bottom surface 28. In the assembled position of the cutting tool 40, the upper jaw bottom surface 84 abuts the shaft top surface 24, the lower jaw surface 90 abuts the shaft bottom surface 26 and the cutting portion support surface 100 abuts the cutting portion bottom surface 28. According to embodiments of the invention, the upper jaw surface 84 has first and second surfaces 104, 106 inclined at an angle γ and δ respectively, to the middle plane P1 and wherein γ and δ may be equal. The first and second surfaces 104, 106 may both be planar.

Figure 6:
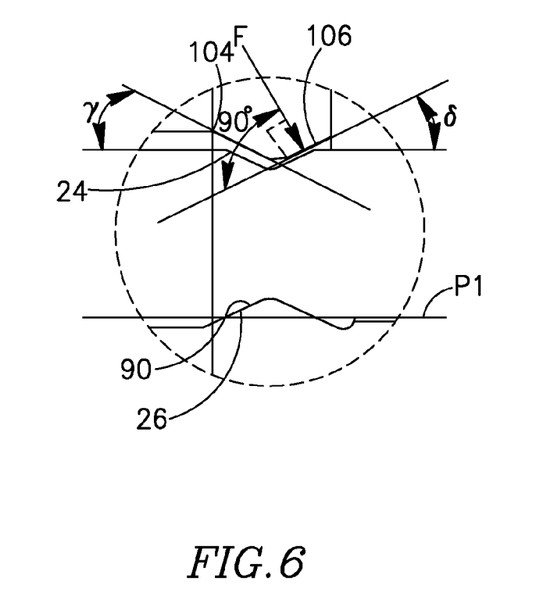
FIG. 6 is an enlarged detail of the cutting tool of FIG. 5, illustrating the mating arrangement between the cutting insert shaft bottom and the lower clamp upper surface.
Figure 7:
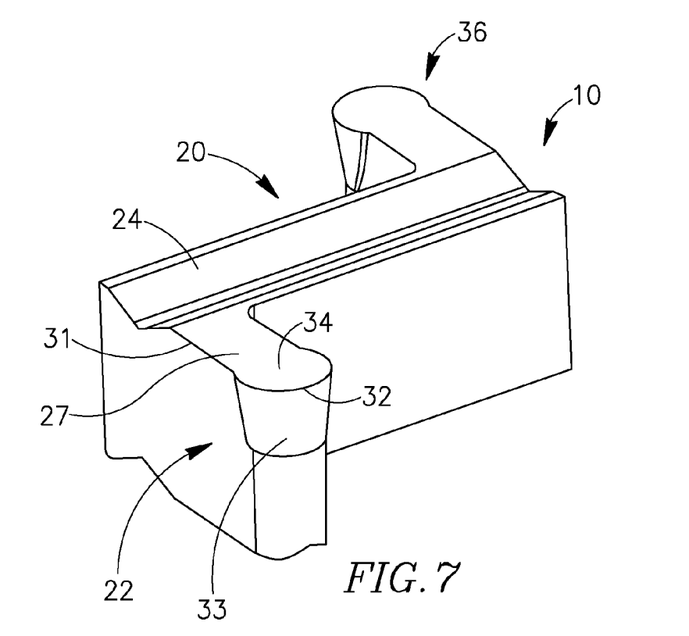
FIG. 7 is a top isometric view of a cutting insert in accordance with embodiments of the present invention.
Figure 8:
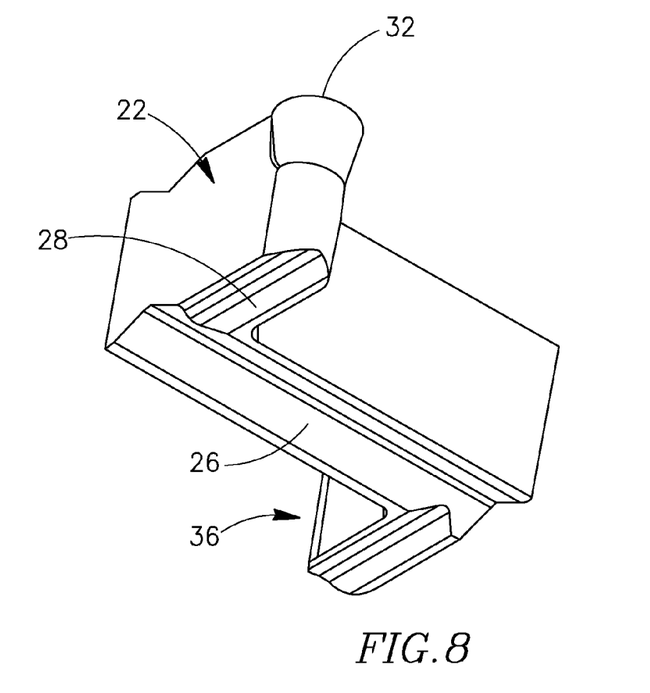
FIG. 8 is a bottom isometric view of the cutting insert of FIG. 7.
Figure 9:
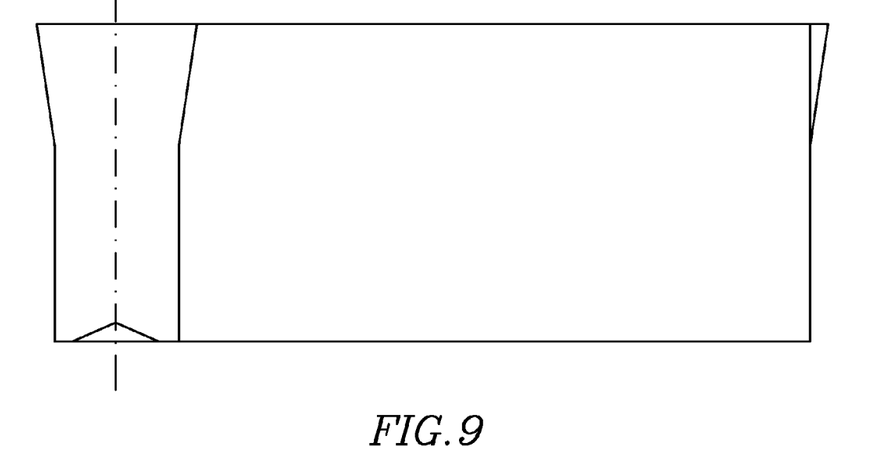
FIG. 9 is a side view of the cutting insert of FIG. 7.
Figure 10:
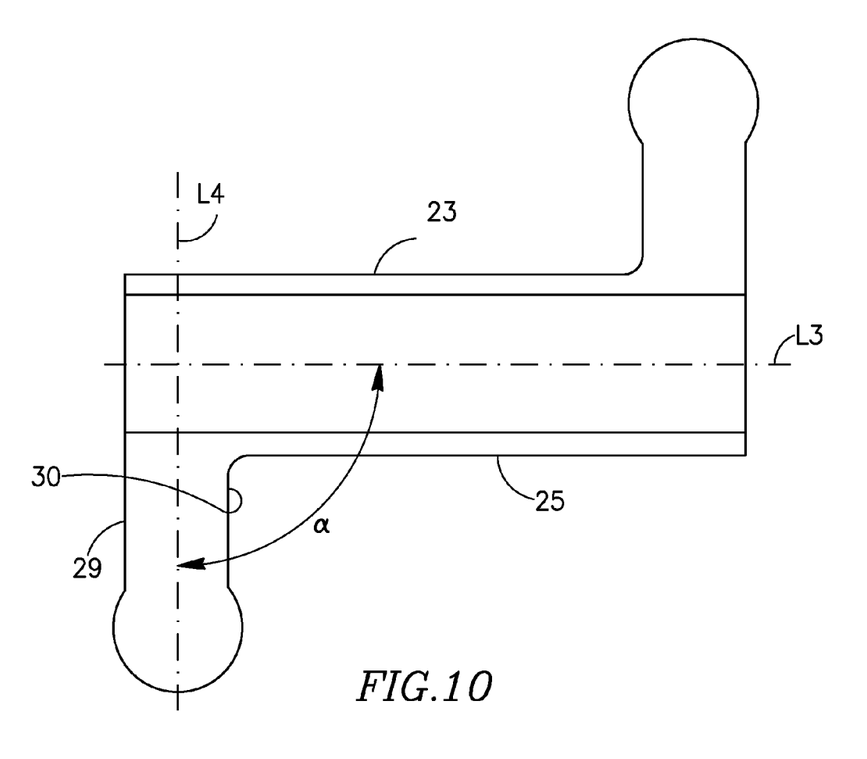
FIG. 10 is a top view of the cutting insert of FIG. 7.
Figure 11:
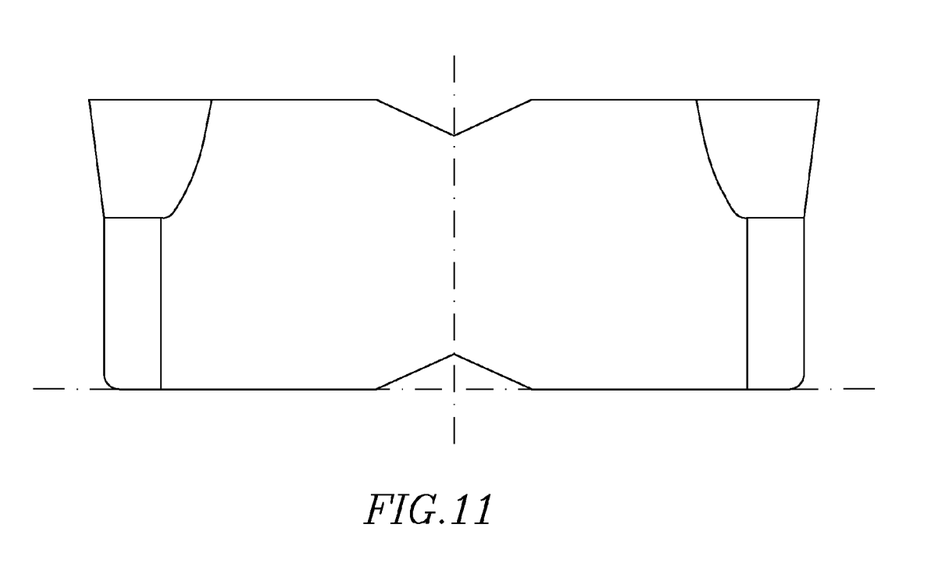
FIG. 11 is a front view of the cutting insert of FIG. 7.
Figure 12:
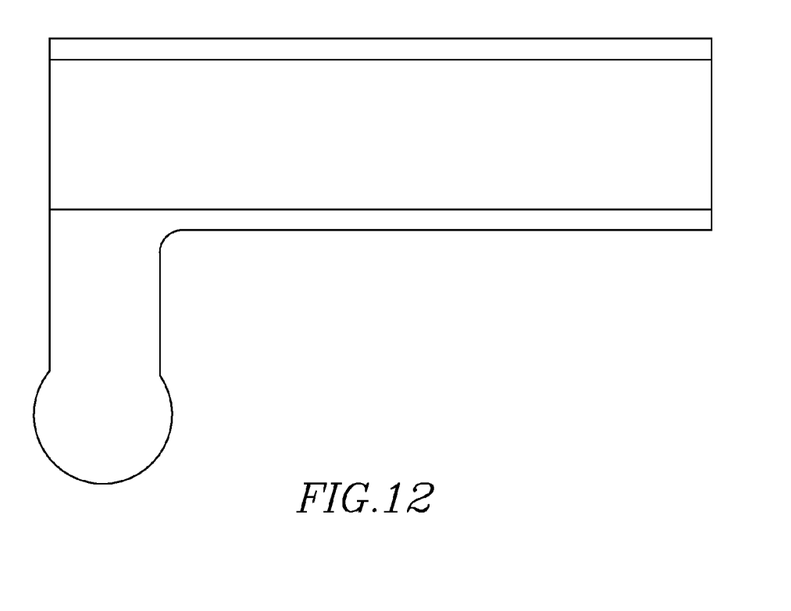
FIG. 12 is a top view a cutting insert with one cutting portion in accordance with embodiments of the present invention.

According to an embodiment shown in FIG. 6, the upper jaw bottom surface 84 has an asymmetrical V-shaped profile. This shape enables, when the upper clamp 74 is tightened towards the lower jaw 76, a force F to be applied, first and foremost, in a direction perpendicular to the second surface 106. The force F applies a right hand torque on the cutting insert 10 with respect to the rearward direction. This torque forces the cutting portion 22 onto the cutting portion support surface 100. In FIG. 6 the cutting insert 10 is shown in a seated position between the upper and lower jaws 74, 76 before the clamping screw 53 has been tightened. It can be seen that while the cutting insert 10 is seated on the lower jaw 76, the second surface 106 is closer to the corresponding shaft top surface 24 than the first surface 104 and thus will be the first of the two to make contact with the shaft top surface 24. This is a way of assuring secure and accurate location of the cutting insert 10 every time it is replaced.

Attention is now drawn to FIG. 13 to FIG. 16, showing the physical support provided against longitudinally-directed forces acting on the cutting insert 10 when the tool is in a working mode. In accordance with embodiments of the present invention, support is provided also against longitudinally-directed forces acting on the cutting insert by providing the cutting portion 22 with a non-planar cutting portion bottom surface 28 that mates with the corresponding abutting cutting portion support surface 100.

Figure 13:
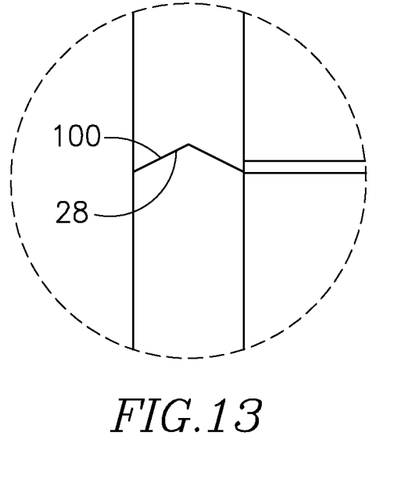
FIG. 13 is an enlarged detail of the cutting tool of FIG. 3 of an embodiment of the cutting tool, showing a V-shaped mating arrangement between a male V-shaped cutting portion bottom surface and a female V-shaped cutting portion support surface.
Figure 14:
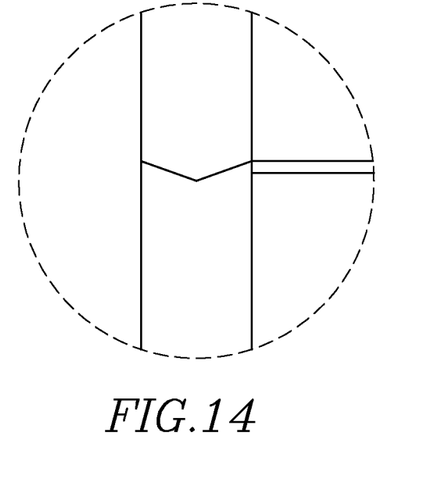
FIG. 14 is an enlarged detail similar to that of FIG. 13 of an embodiment of the cutting tool, showing a V-shaped mating arrangement between a female V-shaped cutting portion bottom surface and a male V-shaped cutting portion support surface.
Figure 15:
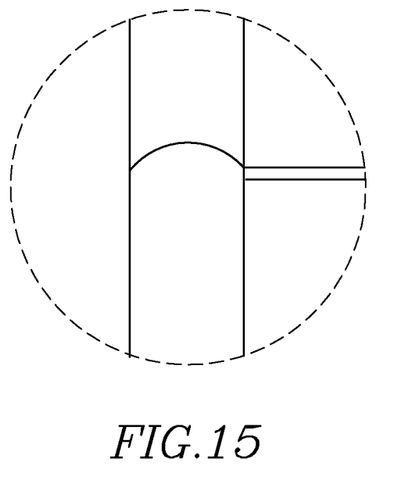
FIG. 15 is an enlarged detail similar to that of FIG. 13 of an embodiment of the cutting tool, showing an concave—convex mating arrangement between the cutting portion bottom surface and the cutting portion support surface.
Figure 16:
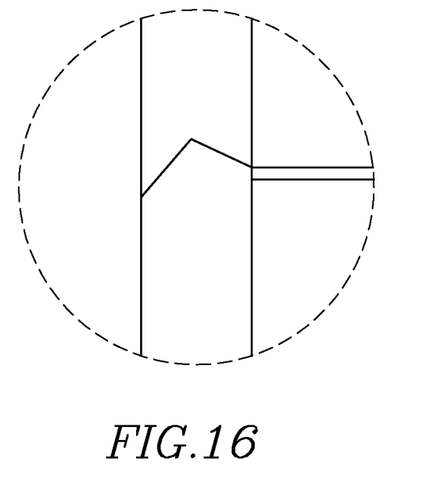
FIG. 16 is an enlarged detail similar to that of FIG. 13 of an embodiment of the cutting tool, showing an asymmetrical V-shaped mating arrangement between the cutting portion bottom surface and the cutting portion support surface.

FIG. 13 to FIG. 16 show the physical support provided against longitudinally-directed forces on the cutting insert. FIG. 13 shows a V-shaped mating arrangement between a female V-shaped cutting portion bottom surface and a male V-shaped cutting portion support surface. FIG. 14 shows the opposite arrangement of FIG. 13. FIG. 15 shows an embodiment of the present invention, in which the cutting portion support surface 100 has a convex profile while the cutting portion bottom surface has a concave profile. FIG. 16 shows an asymmetric arrangement with respect to FIG. 14. It should be noted in general that where this specification discloses a non-planar surface, the intention is to encompass the many such profiles known in the art, including asymmetrical, convex/concave, V-shaped, as well as curved, combined angled and curved, primary and secondary grooves and ridges, and so forth.

Installation of the cutting insert in the insert holder 42 is as follows: The clamping screw 53 is loosened, freeing up the resilient upper jaw 48. The cutting insert is oriented so that the shaft bottom surface 26 aligns with the lower jaw surface 90 (FIG. 6). The shaft 22 is slid rearwardly along the lower jaw surface 90 until the cutting portion bottom surface 28 is stopped by the cutting portion support surface 100. The cutting portion 22 is lifted up, then moved rearwardly and downwards so that the cutting portion bottom surface 28 sits mated with the cutting portion support surface 100 (FIG. 3). The clamping screw 53 is partially tightened, pushing the upper jaw 74 downwards until the first surface 104 comes into contact with the corresponding area of shaft top surface 24, pivoting the shaft bottom surface 26 on the lower jaw surface 90 until the cutting portion bottom surface 28 is in abutment with the cutting portion support surface 100. Further tightening of the clamping screw 53 pushes further down on the upper jaw 48, which is sufficiently resilient due to its elongate shape and relative thinness to allow the upper jaw surface 84 to twist, until the first and second surfaces 104, 106 are both brought into contact with the corresponding areas of the shaft top surface 24.

The cutting tool 40 of the present invention is suited for metal cutting operations such as grooving and turning. A distinguishing feature of the cutting insert 10 and an insert holder 42 according to the present invention is the cutting portion support 93 transversely projecting from the lower jaw 76, the first and second cutting portions 22, 36 and the interface between them. In particular, the cutting portion support 93 reinforces the first and second cutting portions 22, 36 against downward vertical force and the mating of the cutting portion support surface 100 with the cutting portion bottom surface 28 provides support against longitudinally-directed forces, reduces the torque applied on the shaft 20 and serves a position locator during insertion of the cutting insert 10 into the insert holder 42.

Although the present invention has been described to a certain degree of particularity, it should be understood that various alterations and modifications could be made without departing from the spirit or scope of the invention as hereinafter claimed.

What is claimed is:

1. A cutting tool (40) comprising an insert holder (42) and a cutting insert (10), the insert holder (42) comprising:
   a block portion (44) and a clamping portion (46) for retaining the cutting insert (10) and defining a forward to rearward direction, the block portion (44) having upper and lower blocks (48, 50) defining an upper to lower direction and a resilient slot (49) between them and an upper block front face (61) at a forward end of the upper block (48) and a lower block front face (72) at a forward end of the lower block (50); the clamping portion (46) having upper and lower jaws (74, 76) integrally formed with the block portion (44), the upper jaw (74) projecting forwardly from one side of the upper block front face (61) and having an upper jaw surface (84), the lower jaw (76) projecting forwardly from the one side of the lower block front face (72) and having a lower jaw surface (90) facing opposite the upper jaw surface (84); wherein,
   the lower jaw (76) has a cutting portion support (93), the cutting portion support (93) projects transversely at an angle α from the forward end of the lower jaw (76), the cutting portion support (93) has a generally upward facing cutting portion support surface (100);

the cutting insert (10) has a shaft (20) having shaft top and bottom surfaces (24, 26) and opposing side surfaces (23, 25) which extend therebetween, a first cutting portion (22) integrally formed with the shaft (20), the first cutting portion (22) projects transversely to the shaft (20) at the angle α from a first shaft end, the first cutting portion (22) has opposing cutting portion top and bottom surfaces (27, 28) and opposing cutting portion side surfaces (29, 30) which extend between the cutting portion top and bottom surfaces (27, 28), the cutting portion top surface (27) and the cutting portion side surfaces (29, 30) meet at an edge (31), at least a portion of which forms a cutting edge (32), wherein, in the assembled position of the cutting tool (40), the upper jaw surface (84) abuts the shaft top surface (24), the lower jaw surface (90) abuts the shaft bottom surface (26) and the cutting portion support surface (100) abuts the cutting portion bottom surface (28); and wherein the cutting portion bottom surface (28) is non-planar.

2. The cutting tool of claim 1, wherein the cutting insert (10) is provided with a second cutting portion (36) formed integrally with the shaft (20) and projecting transversely to the shaft (20) from a second shaft end at the angle α.

3. The cutting tool of claim 1, wherein the lower jaw surface (90) has a profile that is either convex or concave.

4. The cutting tool of claim 1, wherein the lower jaw surface (90) has a profile that is V-shaped.

5. A cutting insert (10) comprising:
a shaft (20) having shaft top and bottom surfaces (24, 26) and opposing side surfaces (23, 25) extending therebetween; and
a first cutting portion (22) integrally formed with the shaft (20), the first cutting portion (22) projecting transversely to the shaft (20) from one shaft end at an angle α; wherein:
the first cutting portion (22) has cutting portion top and bottom surfaces (27, 28) and opposing side surfaces (29, 30) extending therebetween;
the cutting portion top surface (27) and the cutting portion side surfaces (29, 30) meet at an edge (31), at least a portion of which forms a cutting edge (32);
the cutting portion side surfaces (29, 30) adjacent the cutting edge (32) form a relief surface (33);
the cutting portion top surface (27) adjacent the cutting edge (32) forms a rake surface (34); and
the cutting portion bottom surface (28) is non-planar.

6. The cutting insert (10) according to claim 5, wherein the cutting portion bottom surface (28) has a V-shaped profile.

7. The cutting insert (10) according to claim 5, wherein the cutting portion bottom surface (28) has an asymmetrical profile.

8. The cutting insert (10) according to claim 5, wherein the cutting portion bottom surface (28) has an asymmetrical, V-shaped profile.

9. The cutting insert (10) according to claim 5, wherein the cutting portion bottom surface (28) has a profile that is either convex or concave.

10. The cutting insert of claim 5, wherein the angle α is between 80° and 134°.

11. The cutting insert of claim 5, wherein a second cutting portion (36) is formed integrally with the shaft (20) and projects transversely to the shaft (20) from a second shaft end at said angle α.

12. The cutting insert of claim 11, wherein the angle α is between 80° and 134°.

13. A cutting tool insert holder (42) comprising:
a block portion (44) having upper and lower blocks (48, 50) defining an upper to lower direction, a resilient slot (49) between the upper and lower blocks (48, 50), an upper block front face (61) at a forward end of the upper block (48), and a lower block front face (72) at a forward end of the lower block (50); and
a clamping portion (46) comprising upper and lower jaws (74, 76) integrally formed with the block portion (44), the clamping portion defining a forward to rearward direction; wherein:
the upper jaw (74) projects forwardly from one side of the upper block front face (61) and has an upper jaw surface (84);
the lower jaw (76) projects forwardly from the one side of the lower block front face (72) and has a lower jaw surface (90) facing opposite the upper jaw surface (84);
the lower jaw (76) has a cutting portion support (93) which projects transversely at an angle α from a forward end of the lower jaw (76); and
the cutting portion support (93) has a generally upward facing cutting portion support surface (100).

14. The cutting tool insert holder (42) of claim 13, wherein the angle α is between 80° and 134°.

15. The cutting tool insert holder (42) of claim 13, wherein the lower jaw surface (90) has a profile that is either convex or concave.

16. The cutting tool insert holder (42) of claim 13, wherein the lower jaw surface (90) has a profile that is V-shaped.

17. The cutting tool insert holder (42) of claim 13 in combination with a cutting insert retained therein, wherein:
the upper jaw surface (84) abuts a top surface of the cutting insert;
the lower jaw surface (90) abuts a non-planar first bottom surface (26) of the cutting insert; and
the cutting portion support surface (100) abuts a non-planar second bottom surface (28) of the cutting insert, the non-planar second bottom surface (28) extending in a direction transverse to the non-planar first bottom surface (26) of the cutting insert.

* * * * *